United States Patent
Atieh

(10) Patent No.: US 10,016,083 B1
(45) Date of Patent: Jul. 10, 2018

(54) SECURE MAILBOX AND A MAILBOX APPLICATION IN A CONNECTED USER DEVICE

(71) Applicant: Saleh (Sam) Atieh, Saint Joseph, MO (US)

(72) Inventor: Saleh (Sam) Atieh, Saint Joseph, MO (US)

( * ) Notice: Subject to any disclaimer, the term of this patent is extended or adjusted under 35 U.S.C. 154(b) by 0 days.

(21) Appl. No.: 15/650,869

(22) Filed: Jul. 15, 2017

(51) Int. Cl.
  *G08B 13/14* (2006.01)
  *A47G 29/12* (2006.01)
  *H04N 5/225* (2006.01)
  *G06K 9/00* (2006.01)
  *G06F 17/30* (2006.01)
  *G07C 9/00* (2006.01)
  *H04L 29/08* (2006.01)
  *H04W 84/12* (2009.01)

(52) U.S. Cl.
  CPC .... *A47G 29/1214* (2013.01); *G06F 17/30011* (2013.01); *G06K 9/00087* (2013.01); *G07C 9/00079* (2013.01); *H04N 5/2257* (2013.01); *H04L 67/1097* (2013.01); *H04W 84/12* (2013.01)

(58) Field of Classification Search
  CPC .............. A47G 29/1214; A47G 29/121; H04N 5/2257; G06K 9/00087; G06F 17/30011; G07C 9/00079
  USPC .................................. 340/569; 709/206, 207
  See application file for complete search history.

(56) References Cited

U.S. PATENT DOCUMENTS

| 8,655,795 B1* | 2/2014 | Kolchin | G06Q 10/04 340/569 |
|---|---|---|---|
| 2002/0024438 A1* | 2/2002 | Roberson | A47G 29/1214 340/569 |
| 2010/0111357 A1* | 5/2010 | Manuel-Devadoss | G06Q 10/08 382/101 |
| 2013/0038450 A1* | 2/2013 | Stewart | G06Q 10/08 340/569 |
| 2014/0111333 A1* | 4/2014 | Haas | G08B 23/00 340/539.11 |
| 2015/0016665 A1* | 1/2015 | Tanner | A47G 29/1214 382/101 |
| 2015/0108209 A1* | 4/2015 | Cho | A47G 29/1212 232/34 |
| 2015/0262122 A1* | 9/2015 | Jenkins | G06Q 10/0833 705/333 |

(Continued)

*Primary Examiner* — Thomas Mullen
(74) *Attorney, Agent, or Firm* — Kanika Radhakrishnan; Evergreen Valley Law Group

(57) ABSTRACT

In an embodiment, a smart mailbox includes a main body, a sensor module, a camera module, a transmission module and a biometric sensor module. The main body includes an enclosed space for storing mails and an opening for inserting mails into the enclosed space. The sensor module is configured to detect presence of one or more mails in the enclosed space. The camera module is configured to capture one or more images of at least a part of the one or more mails. The transmission module is configured to send a notification of presence of the one or more mails and the one or more images to a user device associated with a user. The biometric sensor module is disposed on the main body and is configured to authenticate identity of the user accessing the mailbox to retrieve the one or more mails from the enclosed space of the mailbox.

20 Claims, 9 Drawing Sheets

(56) References Cited

U.S. PATENT DOCUMENTS

2016/0060008 A1* 3/2016 Farentinos ............. B65D 43/16
                                                    220/211
2016/0278558 A1* 9/2016 Ansari ............... A47G 29/1214
2017/0265667 A1* 9/2017 Barrs, II ............ A47G 29/1209

* cited by examiner

SECURE MAILBOX AND A MAILBOX APPLICATION IN A CONNECTED USER DEVICE

TECHNICAL FIELD

The present disclosure relates to a mailbox and, more particularly to a secure mailbox that is communicably coupled to a user device and a mailbox application that is available on the user device connected to the mailbox.

BACKGROUND

Conventional mailboxes have an enclosed space for receiving mails. The mailbox is either provided with no locking mechanism or a locking system that is not entirely tamper proof. Although the conventional locking systems provide security to the mailbox, the mailbox still remains susceptible to theft and other intrusions. When there is no provision for a locking system, mails inside the mailbox can be accessed by anyone, leading to identity theft. Moreover, loss of keys or forgetting the combination of codes for accessing the mailbox requires replacement of the conventional locks, which leads to unnecessary expenses.

In conventional mailboxes, a user has to manually check for presence of mails in the mailbox for retrieval of the mails. Furthermore, hazardous substances may be dropped in the mailbox that may harm the user who is unaware of the contents of the mailbox while accessing the mailbox.

In view of the above, there is requirement for a mailbox that provides security and safety to users and also incorporates provisions for notifying the contents of the mailbox to the users.

SUMMARY

In an embodiment, a mailbox is disclosed. The mailbox includes a main body, a sensor module, a camera module, a transmission module and a biometric sensor module. The main body includes an enclosed space for storing mails therein. The main body includes an opening for inserting mails into the enclosed space. The sensor module is configured to detect presence of one or more mails in the enclosed space. The camera module is configured to capture one or more images of at least a part of the one or more mails. The transmission module is configured to send a notification of presence of the one or more mails and the one or more images to a user device associated with a user. The biometric sensor module is disposed on the main body. The biometric sensor module is configured to authenticate identity of the user accessing the mailbox to retrieve the one or more mails from the enclosed space of the mailbox.

In another embodiment, a user device communicably coupled to a mailbox is disclosed. The user device includes a communication interface and a processor. The communication interface is configured to receive communication from the mailbox. The mailbox includes a sensor module and a camera module. The sensor module is configured to detect presence of one or more mails in an enclosed space in the mailbox. The camera module is configured to capture one or more images of at least a part of the one or more mails. The processor is configured to run a mailbox application accessible on the user device to cause the user device, at least in part to receive a notification of presence of the one or more mails in the mailbox and display the notification on a user interface of the user device. The notification being at least one of a text indicating presence of the one or more mails in the enclosed space in the mailbox and the one or more images.

In another embodiment, a mailbox is disclosed. The mailbox includes a main body, a camera module and a biometric sensor module. The main body includes an enclosed space for storing mails therein. The main body includes an opening for inserting mails into the enclosed space. The camera module includes a sensor module and a transmission module. The sensor module is configured to detect insertions of one or more mails in the enclosed space. The transmission module is configured to send a notification of presence of the one or more mails and one or more images of at least a part of the one or more mails to a user device associated with a user. The one or more images are captured by the camera module in response to detection of insertions of the one of more mails by the sensor module. The biometric sensor module is disposed on the main body. The biometric sensor module is configured to authenticate identity of the user accessing the mailbox to retrieve the one or more mails from the enclosed space of the mailbox.

In another embodiment, a method for electronically organizing mails in a mailbox is disclosed. The method includes receiving a notification of presence of one or more mails in the mailbox. The notification is at least one of a text indicating presence of the one or more mails and one or more images of the one or more mails. The method further includes retrieving the one or more mails from the mailbox. The retrieving of the one or more mails includes authenticating identity of a user accessing the mailbox by a biometric sensor module of the mailbox, scanning the one or more mails retrieved from the mailbox using a mailbox application in the user device and storing the one or more scanned copies of the one or more mails in a storage location associated with the user device.

BRIEF DESCRIPTION OF THE DRAWINGS

The invention itself, together with further features and attended advantages, will become apparent from consideration of the following detailed description, taken in conjunction with the accompanying drawings. One or more embodiments of the present invention are now described, by way of example/s only, with reference to the accompanied drawings wherein like reference numerals represent like elements and in which.

Figure 1:
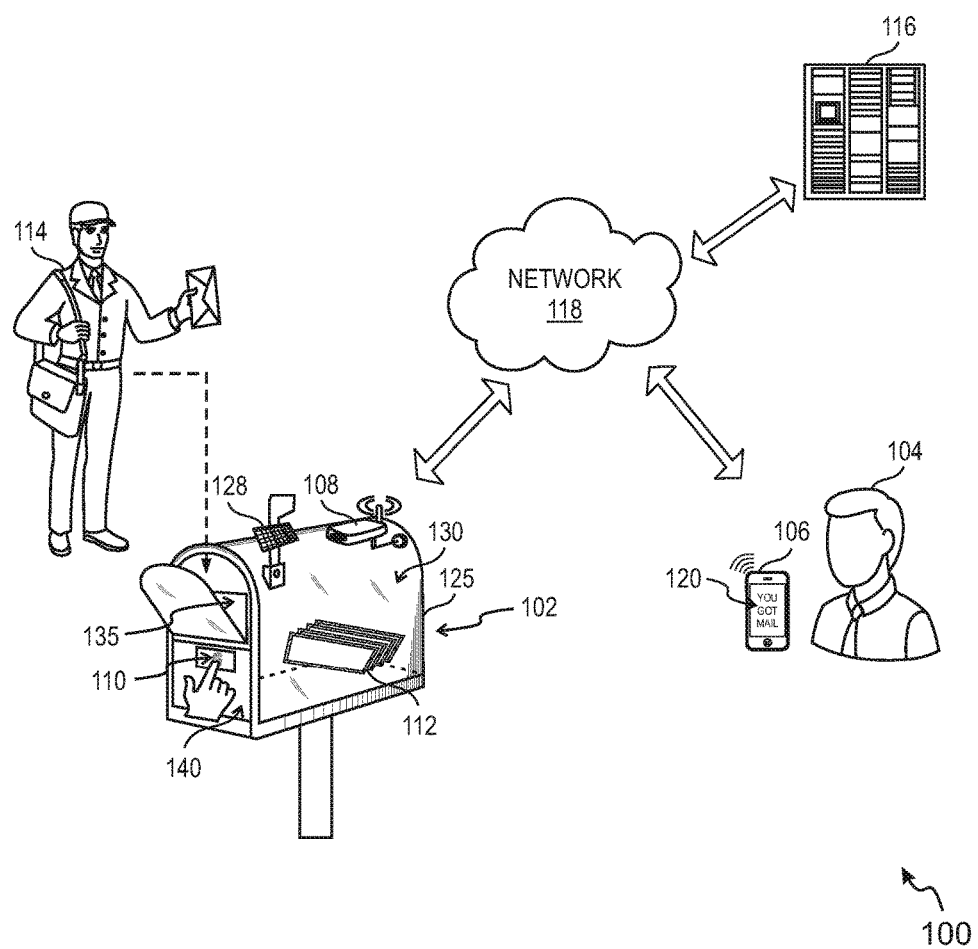
FIG. 1 illustrates an environment, in accordance with an example embodiment of the present disclosure.

The drawings referred to in this description are not to be understood as being drawn to scale except if specifically noted, and such drawings are only exemplary in nature.

DETAILED DESCRIPTION

In the following description, for purposes of explanation, various specific details are set forth in order to provide a thorough understanding of the present disclosure. It will be apparent, however, to one skilled in the art that the present disclosure can be practiced without these specific details. In other instances, methods are shown in diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various embodiments of the present disclosure provide a smart mailbox that is configured to send a notification of presence of one or more mails to a user device associated with a user. The smart mailbox includes a camera module, a biometric sensor module, a sensor module and a transmission module. The sensor module is configured to sense the presence of the one or more mails in the smart mailbox. The camera module disposed in a main body of the smart mailbox captures one or more images of the mails present in the mailbox. For instance, when the sensor module detects that one or more mails are inserted in the mailbox, the camera module may be triggered to capture images of the one or more mails. Further, the user is notified of the presence of the mails in the mailbox through the transmission module. The transmission module sends a notification of presence of the one or more mails and the one or more images to the user device associated with the authorized user of the smart mailbox. In an embodiment, the transmission module sends the notification to the user device via Bluetooth. Alternatively, the transmission module sends notification and the one or more images to a server that forwards the notification to the user device associated with the user.

In an embodiment, the sensor module and the transmission module can be integral components of the camera module. Upon receiving the notification of the delivered mails from the smart mailbox, the user has the option of viewing the one or more images captured by the camera module or viewing the images later. Thereafter, the user can collect the one or more mails from the mailbox.

The user is allowed to access the enclosed space of the smart mailbox upon verification of identity by the biometric sensor module. For example, the user can use his/her fingerprint on the biometric sensor module to verify the identity and then access the mails in the smart mailbox. The smart mail box does not open when the fingerprint is not recognized by the biometric sensor module. The components of the smart mailbox are powered by a battery. In an embodiment, the battery is charged by a solar panel, disposed on the smart mailbox.

The user can access an application associated with the smart mailbox in a user device for receiving notification of the presence of mails in the smart mailbox and viewing an image corresponding to contents in the smart mailbox. The user can further choose to scan document in the mail after retrieving the mail from the mailbox. The application provides option for the user to organize scanned documents. The scanned document can be stored in any folder of a plurality of folders that is pre-configured in the application. Alternatively, the user can create a new folder to store the scanned document. In an embodiment, the documents are stored on the cloud. The user can retrieve the scanned document from any location on the user device and display it on the user device. Further the user can print the scanned document of the mail using a printer (either using wireless protocols or wired medium) or share the document with any other user device in the vicinity or remotely.

FIG. 1 shows an example representation of an environment 100, where at least some embodiments of the present disclosure can be implemented. The environment 100 shows a smart mailbox 102 configured to communicate with at least one of a user device 106 associated with a user 104 and a server 116 using a network 118. Examples of the user device 106 is not limited to mobile phones only, and the user device 106 may take examples of any portable electronic device (e.g., laptops, smart phones and tablets) having cellular communication capabilities. For instance, the user device 106 may be an electronic device that can be equipped with a subscriber identity module (SIM) or the like, so that the device is capable of being communicably coupled to the network 118.

The smart mailbox 102 includes a main body 125 comprising an enclosed space 130 configured to receive one or more mails 112 via an opening 135 for inserting the one or more mails into the enclosed space 130. The mailbox 102 includes a camera module 108 and a biometric sensor module 110. The camera module 108 is disposed inside the smart mailbox 102 and is adapted to take one or more snapshots of mails 112 that are delivered. When a mailman 114 drops the mails 112 inside the mailbox 102, the camera module 108 senses presence of the mails 112 and captures one or more images of at least a part of the mails 112. For instance, snapshots of the mails are captured every few seconds (or at a pre-determined rate) after the mailman 114 inserts the one or more mails 112 through the opening 135. In an embodiment, the camera module 108 includes a sensor module that is configured to detect presence of the mails 112 in the enclosed space. For instance, a motion sensor in the camera module 108 detects presence of the mails 112 in the mailbox 102. In alternate embodiments, the sensor module can be configured as separate component from the camera module 108, and the sensor module provides input to the camera module 108 as soon as the sensor module detect that the mails 112 have been inserted in the enclosed space 130. For instance, the sensor module is configured on the opening 135 that senses the mails 112 when the mailman 114 inserts the mails 112 via the opening 135 into the enclosed space 130 and triggers the camera module 108 to capture one or more images of the mails 112. The mailbox 102 is configured to notify the user 104 about the presence of one or more mails 112 by sending a notification to the user device 106 associated with the user 104 over a network 118. The notification may be at least one of a text indicating presence of the one or more mails 112 or at least one image of the one or more mails 112 that are present in the mailbox 102. The user 104 can choose to view the images captured by the camera module 108 by clicking on the notification in the user device 104.

In an embodiment, the notification of the presence of one or more mails 112 and the at least one image are first transmitted to the server 116 over the network 118. Examples of the network 118 include, but are not limited to, the Internet, local area network (LAN), wide area network (WAN), wireless network, wired network, and any combination thereof. In alternate embodiments, the notification of the presence of the one or more mails 112 and the at least one captured image is transmitted to the user device 106 associated with the user 104 via home Wi-Fi network. Alternatively, the mailbox 102 communicates the notification of the mails 112 to the user device 106 by sending signals to cell towers which ultimately send the notification to the user device 104.

After receiving the notification, the user 104 can physically retrieve the mails 112 from the smart mailbox 102. The biometric sensor module 110 disposed on the main body 125 of the mailbox 102 authenticates identity of the user 104 for providing access to the enclosed space 130 of the mailbox 102. The main body 125 of the mailbox 102 comprises an openable door 140 that is configured to open when the biometric sensor module 110 verifies authenticity of the fingerprint of the user 104. The smart mailbox 102 will not open if the fingerprint is not registered. In an embodiment, the smart mailbox 102 also includes a manual key lock (not shown), as a back-up means for locking and unlocking the openable door of the smart mailbox 102 in case of emergency or any other unforeseen problem.

The user 104 can access the server 116 to download a mailbox application 120 for receiving the notifications via the device 106. Additionally, the user 104 can access the application 120 for scanning the one or more mails and storing scanned copies of the one or more mails in a folder.

It should further be noted that the biometric sensor module 110 is not limited to only fingerprint detection, and it may be configured to perform authentication of the user 104 using other techniques such as iris scan and/or authentication of image or voice of the user 104. It must be noted that technology used in the smart mailbox 102 can either be applied to individual home mailbox such as the mailbox 102, or in apartment complex mailboxes, or in mailboxes used in offices or big organizations where there are plurality of mailboxes.

The positioning of various components such as the camera module 108 and biometric sensor module 110 are shown for exemplary representations in FIG. 1, and such representation should not be considered as limiting to the scope of the present disclosure. For instance, in some configurations, these components of the smart mailbox 102 can also be positioned on the door of the mailbox 102, such as shown and described with reference to FIG. 2C. Such configuration would be advantageous in enabling easy manufacture and repair of the mailbox 102, as all of the electronics-based components of the mailbox 102 are positioned or disposed on the door 140.

Figure 2A:
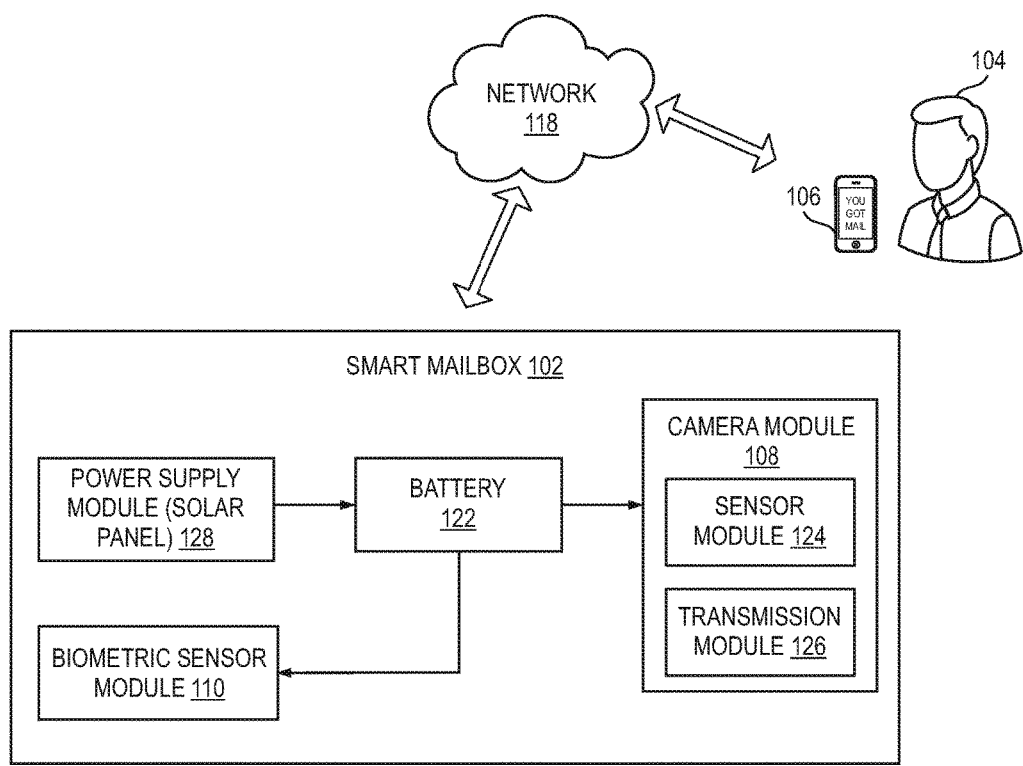
FIG. 2A illustrates a schematic block diagram of a smart mailbox, in accordance with an example embodiment.
Figure 2B:
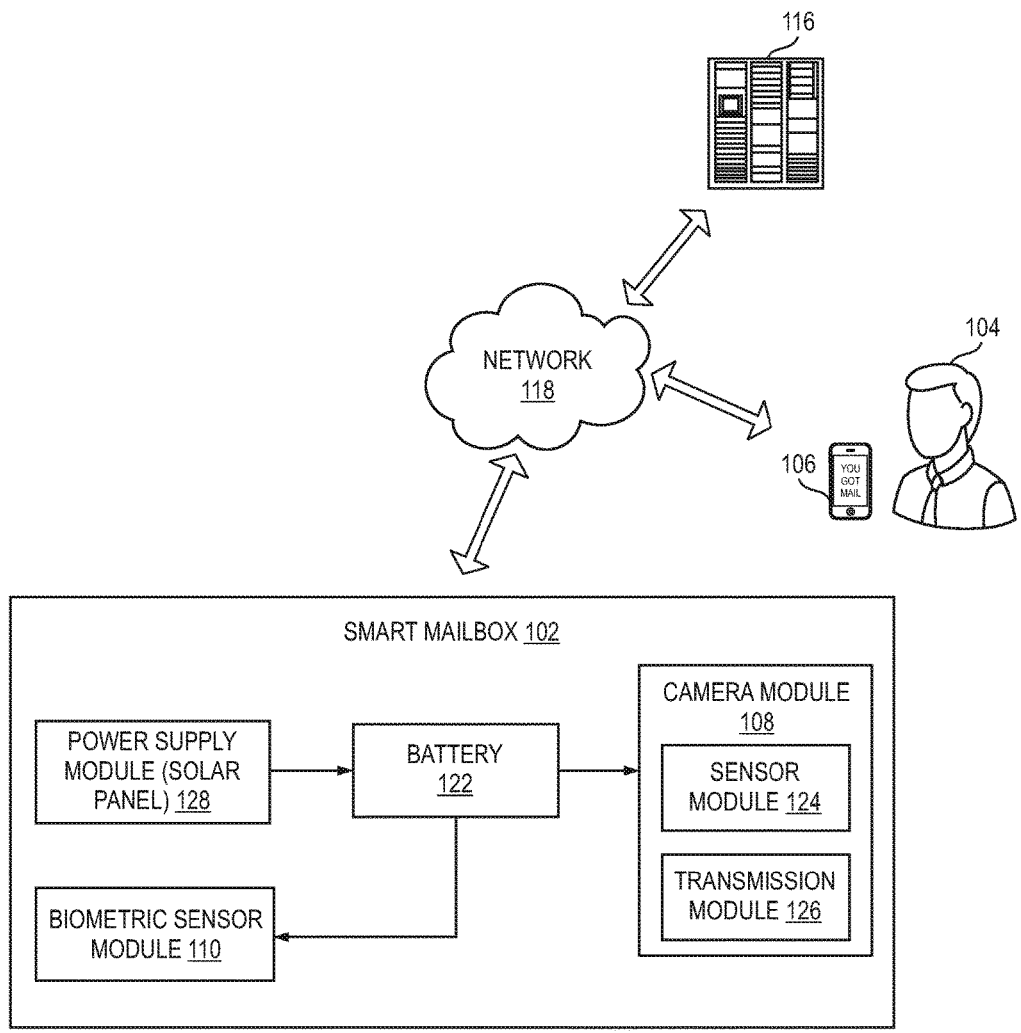
FIG. 2B illustrates another schematic block diagram of a smart mailbox, in accordance with another example embodiment.

FIGS. 2A and 2B illustrate simplified block diagram representations of the smart mailbox 102 and usage thereof, in accordance with some embodiments of the present disclosure. The smart mailbox 102, among other components, includes a battery 122, the camera module 108, the biometric sensor module 110 and a power supply module 128. In an embodiment, the power supply module 128 comprises one or more solar panels disposed on outer surface of the main body of the smart mailbox 102. The power supply module 128 is adapted to charge the battery 122. In an embodiment, the battery 122 is a lithium battery. The battery 122 is configured to power the different components of the smart mailbox 102. The camera module 108, disposed inside the main body (see 125, FIG. 1) of the mailbox 102 includes a sensor module 124 and a transmission module 126. Upon delivery of mails (e.g., the mails 112), the sensor module 124 detects the entry of the mails inside the smart mailbox 102 and thereafter the camera module 108 captures one or more images of the mails present inside the smart mailbox 102. In an embodiment, the camera module 108 includes a flash generating device for capturing the images of the mails in poor lighting (or absence of light). In the illustrated embodiment of FIG. 2A, after the images are captured by the camera module 108, the transmission module 126 sends a notification to the user device 106 associated with the user 104 over the network 118. In another embodiment illustrated in FIG. 2B, the transmission module 126 sends the notification of presence of the mails and the one or more images associated with the mails to the server 116. Thereafter, the server 116 is configured to send the notification comprising the one or more images to the user device 106. It must be noted that the sensor module 124 and the transmission module 126 can either be integrated into the camera module 108 (as shown in FIG. 2A) or the sensor module 124 and the transmission module 126 can be configured as separate components (i.e. external to the camera module 108) in the mailbox 102. In an embodiment, the sensor module 124 is implemented as an independent component on an opening, such as, the opening 135 (shown in FIG. 1) of the mailbox 102. However, the sensor module 124 and the transmission module 126 are electronically coupled with the camera module 108 when the components (the sensor module 124 and the transmission module 126) are separate components in the mailbox 102.

In an embodiment, the battery 122 comprises an alarm module (not shown in FIGS. 2A and 2B) that is configured to indicate low charge levels in the battery 122 to the user 104. Additionally, the alarm module notifies the user 104 if someone tries to tamper the mailbox 102. For instance, the alarm module is coupled to the transmission module 126 for sending a text notification to the user 104 indicating the low charge levels of the battery 122 or alerts the user 104 about tampering with the mailbox 102.

In an embodiment, the user 104 is configured to receive the notification on an application, for example, the mailbox application 120 (shown in FIG. 1). An instance of the application is provided by a server such as the server 116. When the user 104 receives the notification on the user device 106, the user 104 is provided with an option to view the captured images of the one or more mails present in the smart mailbox 102 on the mailbox application 120. The user 104, having seen images of the mails 112 on the mailbox application 120, can thereafter physically collect the mails 112 from the smart mailbox 102. The smart mailbox 102 has an openable door that can be unlocked by placing a registered fingerprint on the biometric sensor module 110. The biometric sensor module 110 is configured to match a fingerprint obtained from the user 104 for accessing the mailbox 102 with one or more registered fingerprints in the biometric sensor module 110. When the fingerprint matches with at least one registered fingerprint, the biometric sensor module 110 allows access to the enclosed space 130 of the smart mailbox 102. The smart mailbox 102 will not unlock if the biometric sensor module 110 does not find a match of the fingerprint with the one or more registered fingerprints. It must be noted that the user 104 can add one or more fingerprints corresponding to acquaintances to the biometric sensor module 110 for facilitating access to the mailbox 102. Additionally, the user 104 can also remove/delete fingerprints of the registered acquaintances as and when required to deny access to the mailbox 102. The battery 122 provides power to at least one of the sensor module 124, the camera module 108, the transmission module 126 and the biometric sensor module 110.

Figure 2C:
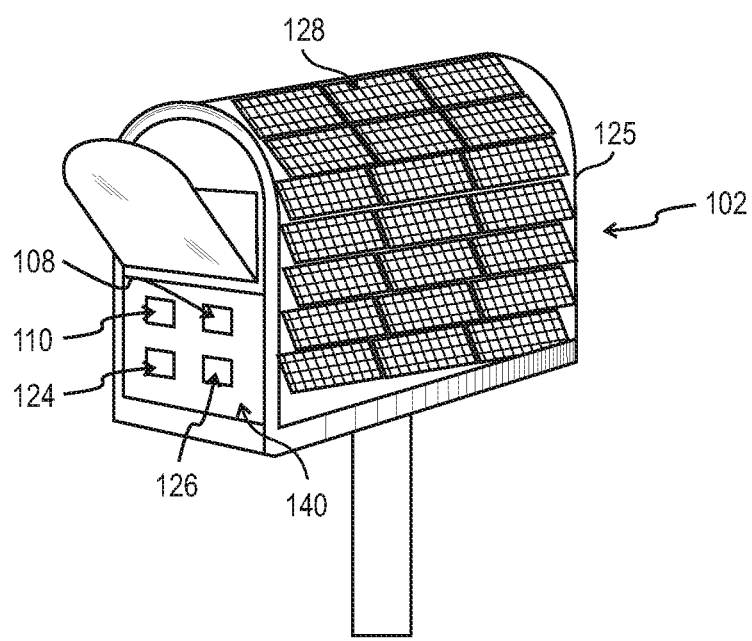
FIG. 2C illustrates a schematic diagram of a smart mailbox, in accordance with an example embodiment.

Referring now to FIG. 2C, a schematic diagram of a smart mailbox 102 is illustrated in accordance with an example embodiment. In this example representation, the camera module 108, the biometric sensor module 110, the sensor module 124 and the transmission module 126 are disposed on the openable door 140 of the mailbox 102. Such installation of the modules 108, 110, 124 and 126 on the openable door 140 enables easy manufacture of mailbox 102, or also result into easy maintenance and replacement of the openable door 140 of the existing mailboxes. The outer surface of the main body 125 is covered with solar cells 128 that provide power to the modules 108, 110, 124 and 126 of the mailbox. The operation of the modules 108, 110, 124 and 126 have been explained with reference to FIGS. 1, 2A, 2B and have been omitted here for the sake of brevity.

Figure 3:
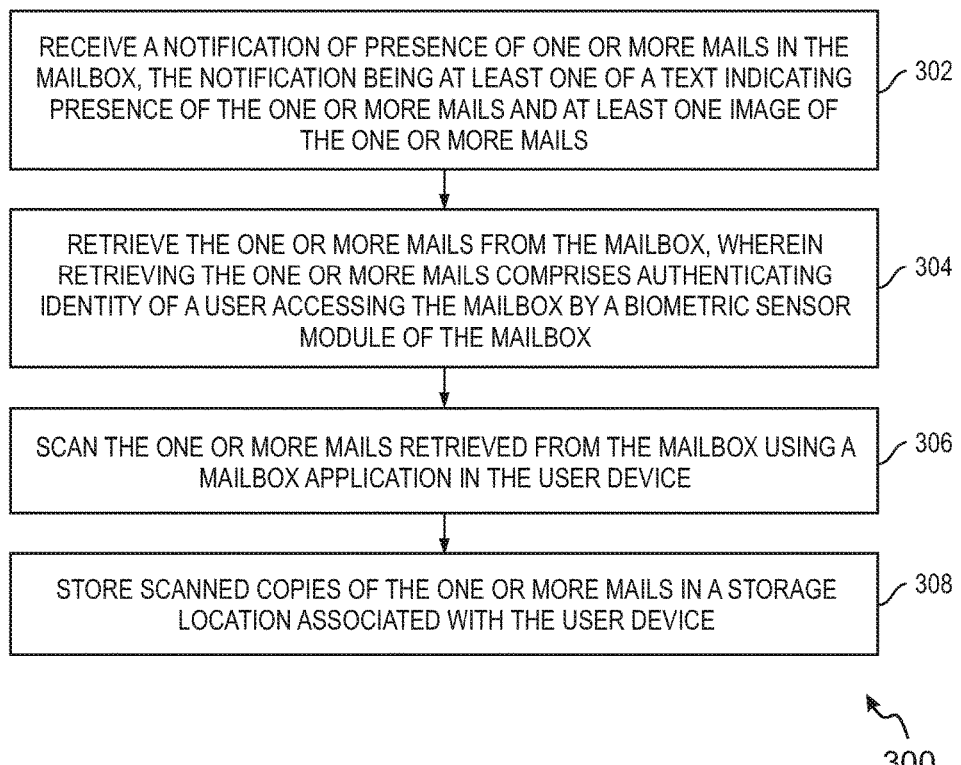
FIG. 3 is a flow diagram depicting sequence of steps for scanning and archiving a mail received at a mailbox, in accordance with an example embodiment.

Referring now to FIG. 3, a flow diagram of a method 300 for electronically organizing mails in a mailbox, is shown in accordance with an example embodiment. The method 300 can be performed by the mobile device 500 (an example of the user device 106) shown and explained with reference to FIG. 5.

At 302, the method 300 includes receiving a notification of presence of one or more mails in the mailbox. In an embodiment, the notification is at least one of a text indicating presence of the one or more mails and at least one image of the one or more mails. When the mailman drops the mails in the enclosed space of the mailbox, a sensor module detects the presence of the mails and one or more images corresponding to the mails are captured by a camera module in the mailbox. The notification comprising a text message of the presence of the mails and the captured images are sent to a user device associated with the user. In an embodiment, the notification is first sent to a server, such as, the server 116 (shown in FIG. 2B), and the server in turn sends the notification comprising the text image and the one or more images to the user device of the user.

At 304, the method 300 includes retrieving the one or more mails from the mailbox by the user. In an embodiment, retrieving the mails from the mailbox comprises validating identity of the user by a biometric sensor module of the mailbox. The biometric sensor module has one or more fingerprints registered and if the user's fingerprint matches with at least one of the registered fingerprints, the mailbox unlocks for the user to retrieve the mails present therein. Retrieving the mails after authenticating the identity of the user is already explained with reference to FIG. 1.

At 306, the method 300 includes scanning the one or more mails retrieved from the mailbox using the mailbox application present in the user device. The mailbox application is provided by a server, for example, the server 116 (shown in FIG. 1). In an embodiment, the mailbox application can be available from application stores such as Google Play Store, iOS App Store, or any other similar App stores, and the mailbox application can be downloaded from the suitable application store accessible to the user device. The application provides options for the user to scan the one or more mails and generate scanned copies (digital copies) corresponding to the one or more mails.

At 308, the method 300 includes storing scanned copies of the one or more mails in a storage location associated with the user device. In an embodiment, the user can choose to save the scanned copies corresponding to the one or more mails in a plurality of folders displayed within the mailbox application. Alternatively, the user can choose to create a new folder for storing the scanned copies. Organizing and archiving scanned copies of one or more mails is further explained with reference to FIG. 4D.

Figures 4A, 4B:
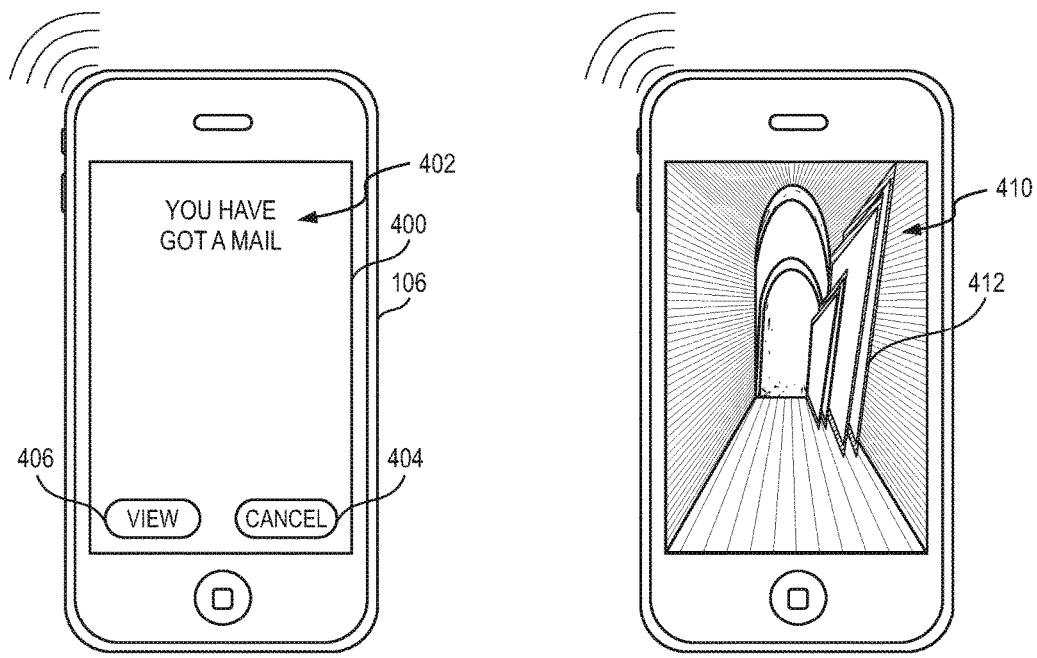
FIG. 4A illustrates a schematic representation of mail notification in a mailbox application, in accordance with an example embodiment.
FIG. 4B illustrates a schematic representation of mail notification in a mailbox application, in accordance with another example embodiment.

Referring now to FIG. 4A, a schematic representation of mail notification 402 in a mailbox application 400 is illustrated in accordance with an example embodiment. The mailbox application 400 is provided on devices, such as the user device 106 (or the mobile device 500) shown and explained with reference to FIG. 1. The mailbox application 400 displays the mail notification 402 on receipt of notification corresponding to detection of one or more mails and associated images from a transmission module (e.g., the transmission module 126) of the mailbox 102 or from a server such as the server 116 connected to the mailbox 102. In response to the mail notification 402, the mailbox application 400 displays a cancel tab 404 and a view tab 406. The user can click on the view tab 406 to view the notification and the at least one image of the mails in the mailbox application 400. Alternatively, the user can click on the cancel tab 404 to view contents of the mail notification 402 at a later time. However, the user can access the mailbox application 400 later to view the notification.

Referring now to FIG. 4B, an example UI representation 410 of the mailbox application 400 is illustrated in accordance with an example embodiment. As shown in the representation 410, the at least one image 412 corresponding to the one or more mails (e.g., the mails 112) in the mailbox 102 as captured by the camera module 108 are shown. It will be understood that the image 412 is shown when the user clicks on the view tab 406 (refer to FIG. 4A) of the notification 402 displayed in the application 400 in the user device 106. In an embodiment, if there are multiple images of the contents of the mailbox, such images may be displayed as thumbnail images in the mailbox application 400 and the user can click on any thumbnail image to view the contents of the mailbox 102 in the application 400.

Figure 4C:
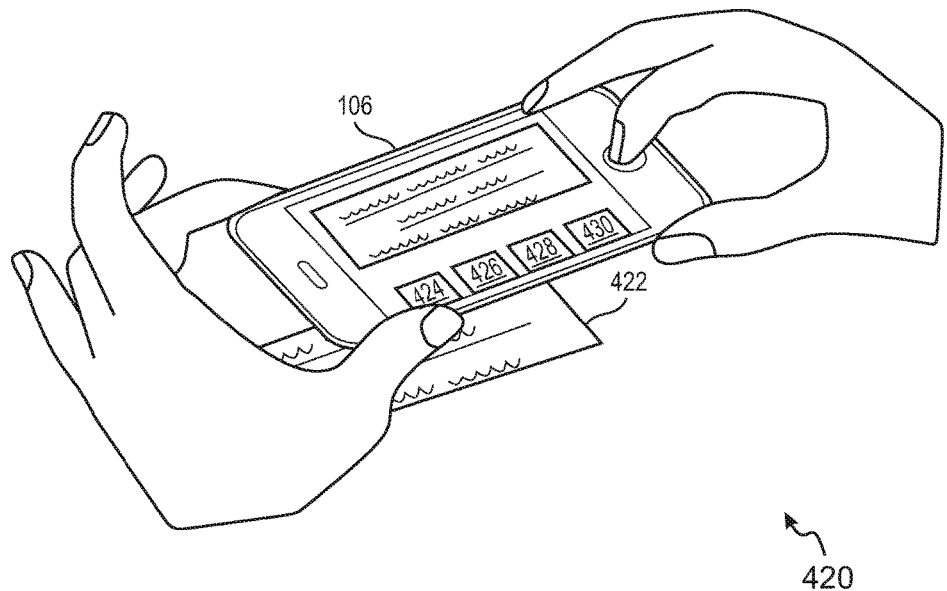
FIG. 4C illustrates a schematic representation of scanning a mail using a mailbox application, in accordance with an example embodiment.

Referring now to FIG. 4C, a schematic representation 420 of scanning a mail 422 using the mailbox application 400 is illustrated in accordance with an example embodiment. In an embodiment, the mail 422 can be scanned using the mailbox application 400. The mailbox application 400 is an example of the application 120 shown and described with reference to FIG. 1. The user device 106, using the application 400, scans the mail 422 to generate scanned copies of the mail 422. It should be understood that the application 400 has access to a camera module present in the user device 106, and the application 400 can initialize the camera module to scan the mail 422. In some cases, where the camera module (image sensors) is not present in the user device 106, the application 400 may also work in conjunction with an external camera device closely coupled to the user device 106. The application 400, upon scanning the mail 422, displays a save tab 424, an edit tab 426, a print tab 428 and a share tab 430 on a bottom part of UI of the application 400. The user can click on the save tab 424 to save the scanned copies of the mail. In an embodiment, the scanned copies are stored in the cloud. Alternatively, the scanned copies are stored locally in storage locations accessible by the user device. The user can click on the edit tab 426 to edit the scanned copies of the mail 422. The scanned copies of the mail 422 can be printed using a wireless printer by clicking on the print tab 428. The user can use the share tab 430 to share the scanned copies of the mail 422 with multiple users by accessing the application 400.

Figure 4D:
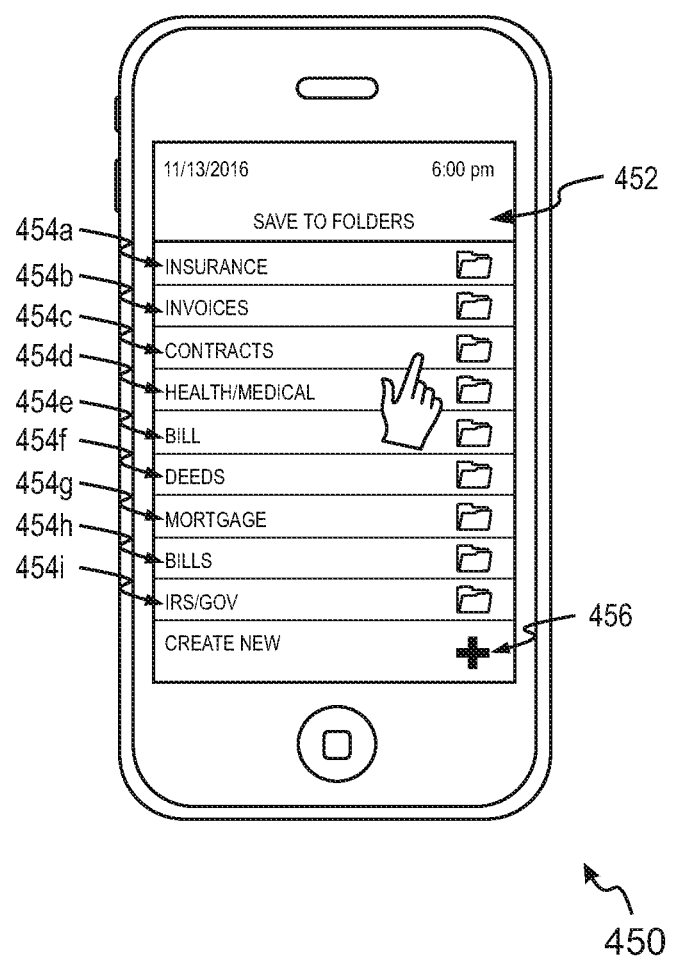
FIG. 4D illustrates a schematic representation of a page for organizing scanned mails using a mailbox application, in accordance with an example embodiment.

Referring now to FIG. 4D, a schematic representation 450 of a page 452 for organizing scanned mails using the mailbox application 400, is illustrated in accordance with an example embodiment. The application 400 displays the page 452 when a user clicks on a save tab 424 after scanning the mail using the application 400. The page 452 displays a plurality of storage folders 454a, 454b, 454c, 454d, 454e, 454f, 454g, 454h and 454i for storing the scanned copies of the mail 422. The user can choose to save the scanned copies of the mail in any of the plurality of storage folders 454a, 454b, 454c, 454d, 454e, 454f, 454g, 454h and 454i by clicking on the corresponding storage folder. In an embodiment, the user can add one or more folders by clicking on add Create tab 456 that is provided on bottom portion of the page 452. The user can add/delete one or more folders for organizing the scanned copies of mails in the storage location provided by the folders 454a, 454b, 454c, 454d, 454e, 454f, 454g, 454h and 454i. In an embodiment, the user can arrange the folders 454a, 454b, 454c, 454d, 454e, 454f, 454g, 454h and 454i based on user preferences for easy access and retrieval.

Figure 5:
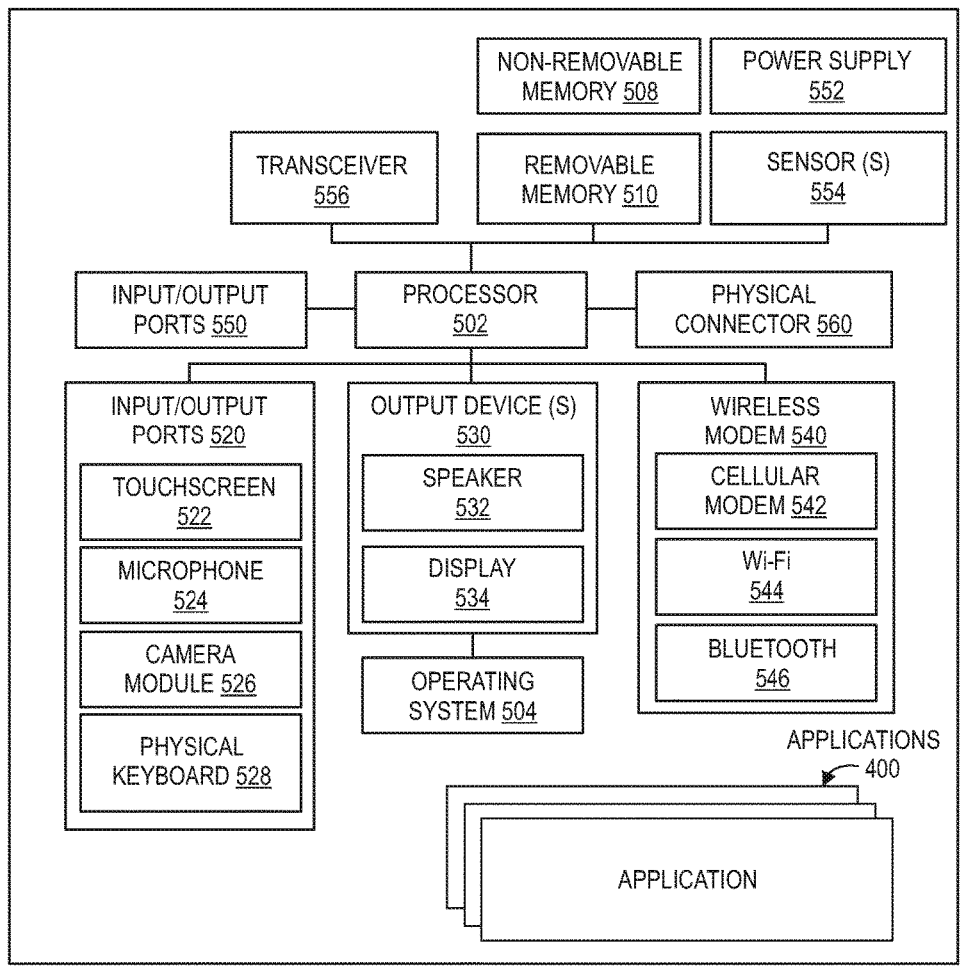
FIG. 5 illustrates a schematic block diagram of a user device, in accordance with an example embodiment.

FIG. 5 is a schematic block diagram of a mobile device 500 that is capable of implementing embodiments for receiving notification of mails, scanning mails and organizing storage of scanned copies of mails in the mobile device 500. It should be understood that the mobile device 500 as illustrated and hereinafter described is merely illustrative of one type of device and should not be taken to limit the scope of the embodiments. As such, it should be appreciated that at least some of the components described below in connection with the mobile device 500 may be optional and thus in an example embodiment may include more, less or different components than those described in connection with the example embodiment of FIG. 5. As such, among other examples, the mobile device 500 could be any mobile electronic device, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated mobile device 500 includes a controller or a processor 502 (e.g., a signal processor, microprocessor, ASIC, or other control and processing logic circuitry) for performing such tasks as signal coding, data processing, image processing, input/output processing, power control, and/or other functions. An operating system 504 controls the allocation and usage of the components of the mobile device 500 and support for one or more applications programs (see application 400), such as a notification interface for viewing the image of the captured snapshot. In addition, to scanning and scanned documents, the application programs can include common mobile computing applications (e.g., telephony applications, E-mail applications, calendars, contact managers, web browsers, messaging applications) or any other computing application.

The illustrated mobile device 500 includes one or more memory components, for example, a non-removable memory 508 and/or removable memory 510. The non-removable memory 508 can include RAM, ROM, flash memory, a hard disk, or other well-known memory storage technologies. The removable memory 510 can include flash memory, smart cards, or a Subscriber Identity Module (SIM). The one or more memory components can be used for storing data and/or code for running the operating system 504 and the application 400. Example of data can include web pages, text, images, sound files, image data, video data, or other data sets to be sent to and/or received from one or more network servers or other devices via one or more wired or wireless networks. The mobile device 500 may further include a user identity module (UIM) 512. The UIM 512 may be a memory device having a processor built in. The UIM 512 may include, for example, a subscriber identity module (SIM), a universal integrated circuit card (UICC), a universal subscriber identity module (USIM), a removable user identity module (R-UIM), or any other smart card. The UIM 512 typically stores information elements related to a mobile subscriber. The UIM 512 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile device 500 can support one or more input devices 520 and one or more output devices 530. Examples of the input devices 520 may include, but are not limited to, a touchscreen 522 (e.g., capable of capturing finger tap inputs, finger gesture inputs, multi-finger tap inputs, multi-finger gesture inputs, or keystroke inputs from a virtual keyboard or keypad), a microphone 524 (e.g., capable of capturing voice input), a camera module 526 (e.g., capable of capturing still picture images and/or video images) and a physical keyboard 528. Examples of the output devices 530 may include, but are not limited to a speaker 532 and a display 534. Other possible output devices (not shown in the FIG. 5) can include piezoelectric or other haptic output devices. Some devices can serve more than one input/output function. For example, the touchscreen 522 and the display 534 can be combined into a single input/output device.

A wireless modem 540 can be coupled to one or more antennas (not shown in the FIG. 5) and can support two-way communications between the processor 502 and external devices, as is well understood in the art. The wireless modem 540 is shown generically and can include, for example, a cellular modem 542 for communicating at long range with the mobile communication network, a Wi-Fi compatible modem 544 for communicating at short range with an external Bluetooth-equipped device or a local wireless data network or router, and/or a Bluetooth-compatible modem 546. The wireless modem 540 is typically configured for communication with one or more cellular networks, such as a GSM network for data and voice communications within a single cellular network, between cellular networks, or between the mobile device 500 and a public switched telephone network (PSTN).

The mobile device 500 can further include one or more input/output ports 550, a power supply 552, one or more sensors 554 for example, an accelerometer, a gyroscope, a compass, or an infrared proximity sensor for detecting the orientation or motion of the mobile device 500, a transceiver 556 (for wirelessly transmitting analog or digital signals) and/or a physical connector 560, which can be a USB port, IEEE 1394 (FireWire) port, and/or RS-232 port. The illustrated components are not required or all-inclusive, as any of the components shown can be deleted and other components can be added.

With the application (see 400) and/or other software or hardware components, the mobile device 500 can implement the technologies described herein. For example, the processor 502 can receive a notification of one or more mails present in a mailbox and images of the one or more mails present in the mailbox, display the notification on a user interface associated with the user device, display the image corresponding to the one or more mails in the mailbox, facilitate scanning of the one or more mails using the mailbox application (e.g., the application 400) and facilitate storing of one or more scanned copies of the one or more mails in a storage location associated with the mobile device 500.

Although the mobile device 500 is illustrated in FIG. 5 in form of a smartphone, but more particularly, the techniques and solutions described herein can be implemented with connected devices having other screen capabilities and device form factors, such as a tablet computer, a smart device, and the like. Without in any way limiting the scope, interpretation, or application of the claims appearing below, a technical effect of one or more of the example embodiments disclosed herein is to provide a method and system for notifying a user of presence of one or more mails in the mailbox, scanning the one or more mails and storing the scanned copies of the one or more mails using the mobile device 500 via the application 400.

Figure 6:
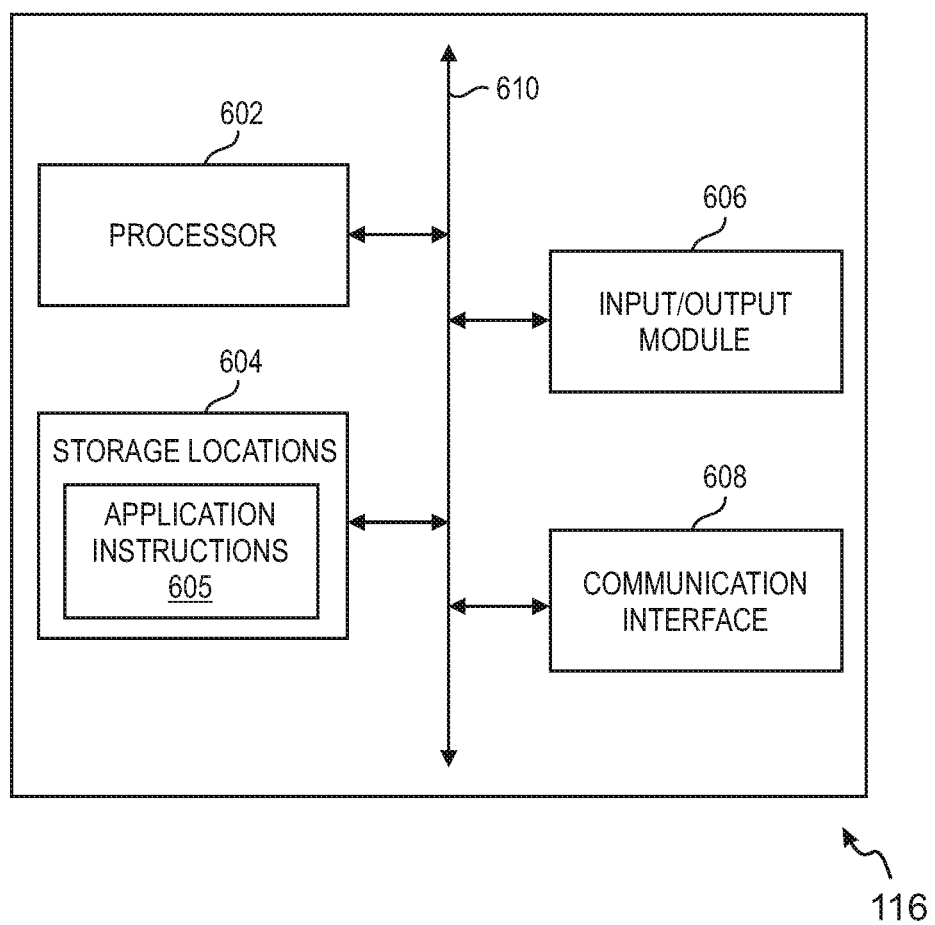
FIG. 6 illustrates a schematic block diagram of a server, in accordance with an example embodiment.

FIG. 6 is a block diagram of the server 116 configured to host and manage the application 400 (or application 120 as shown in FIG. 1) that is provided to user device 106 (or mobile device 500) in accordance with an example embodiment of the invention. The server 116 includes at least one processor such as a processor 602, a plurality of storage locations (such as a storage location 604), an input/output module 606 and a communication interface 608. In some embodiments, the server 116 may be distributed and hosted partially on a plurality of devices or locations, and may be configured to provide instances of the application 400 (or the application 120) over a communication network to the mobile devices.

Although the server 116 is depicted to include only one processor 602, the server 116 may include more number of processors therein. In an embodiment, the storage location 604 (also interchangeably referred to as 'memory 604') is capable of storing instructions 605 that are machine executable instructions associated with the application 400 (e.g., mailbox application). Further, the processor 602 is capable of executing the stored processing instructions 605. In an embodiment, the processor 602 may be embodied as a multi-core processor, a single core processor, or a combination of one or more multi-core processors and one or more single core processors. For example, the processor 602 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, and the like. In an embodiment, the processor 602 may be configured to execute hard-coded functionality. In an embodiment, the processor 602 may be embodied as an executor of software instructions, wherein the software instructions may specifically configure the processor 602 to perform algorithms and/or operations described herein when the software instructions are executed.

The memory 604 may be embodied as one or more volatile memory devices, one or more non-volatile memory devices, and/or a combination of one or more volatile memory devices and non-volatile memory devices. For example, the memory 604 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

The input/output module 606 is configured to facilitate provisioning of an output and/or receiving an input. The I/O module 606 is configured to be in communication with processor 602 and memory 604. Examples of the I/O module 606 include, but are not limited to, an input interface and/or an output interface. Some examples of the input interface may include, but are not limited to, a keyboard, a mouse, a joystick, a keypad, a touch screen, soft keys, a microphone, and the like. Some examples of the output interface may include, but are not limited to, a microphone, a speaker, a ringer, a vibrator, and the like.

In an example embodiment, the processor 602 may include I/O circuitry configured to control at least some functions of one or more elements of I/O module 606, such as, for example, a speaker, a microphone, a display, and/or the like. The processor 602 and/or the I/O circuitry may be configured to control one or more functions of the one or more elements of the I/O module 606 through computer program instructions, for example, software and/or firmware, stored on a memory, for example, the storage location 604, and/or the like, accessible to the processor 602.

The communication interface 608 enables the server 116 to communicate with other entities over various types of networks, such as for example, wired or wireless networks or combinations of wired and wireless networks, such as for example, the Internet. To that effect, the communication interface 608 may include a transceiver circuitry configured to enable transmission and reception of data signals over the various types of communication networks. In an embodiment, the communication interface 608 may receive requests from user mobile devices (device 104) for downloading the application 400. The communication interface 608 may include relevant application programming interfaces (APIs) to facilitate providing an instance of the application 400 (or the application 120) to the mobile device requesting the application 400 and facilitate receiving of notification of the one or more mails present in the smart mailbox and one or more images corresponding to the one or more mails present in the smart mailbox, relying the notification to a user device associated with the smart mailbox, facilitating scanning of the one or more mails and facilitate storage of scanned copies of the one or more mails in storage locations.

In an embodiment, various components of server 116, such as the processor 602, the storage location 604, the I/O module 606 and the communication interface 608 may be configured to communicate with each other via or through a centralized circuit system 610. The centralized circuit system 610 may be various devices configured to, among other things, provide or enable communication between the components (602-608) of the server 116. In certain embodiments, the centralized circuit system 610 may be a central printed circuit board (PCB) such as a motherboard, a main board, a system board, or a logic board. The centralized circuit system 610 may also, or alternatively, include other printed circuit assemblies (PCAs) or communication channel media.

The server 116 as illustrated and hereinafter described is merely illustrative of a system that could benefit from embodiments of the invention and, therefore, should not be taken to limit the scope of the invention. It may be noted that the server 116 may include fewer or more components than those depicted in FIG. 6. As explained above, the server 116 may be included within or embody an electronic device. Moreover, the server 116 may be implemented as a centralized system, or, alternatively, the various components of server 116 may be deployed in a distributed manner while being operatively coupled to each other.

Various example embodiments disclosed herein are capable of securing the mailbox and preventing theft or sabotage of the mails in the mailbox by means of the biometric sensor module providing secure access. The biometric sensor module prevents unauthorized personnel from accessing the mailbox. The mailbox sends notification to a user device associated with the user about the presence of mails that saves the user time and efforts by reducing the number of unnecessary visits to the mailbox. The notification also displays images corresponding to content in the mailbox on the user device so the user can view the contents of the mail box on user device before approaching it and avoid any hazard content. Various example embodiments suggest techniques for accessing an application coupled with the mailbox for scanning the mails. The scanned copies of the mails can be securely stored in storage locations accessible by the user device. Further, the scanned copies in storage locations can be accessed and reproduced anytime.

The present disclosure is described above with reference to block diagrams and flowchart illustrations of method and system embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a system described and depicted in FIG. 5. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims.

What is claimed is:

1. A mailbox, comprising:
    a main body, comprising an enclosed space for storing mails therein, the main body comprising an opening for inserting mails into the enclosed space;
    a sensor module configured to detect a presence of one or more mails in the enclosed space;
    a camera module configured to capture one or more images of at least a part of the one or more mails;
    a transmission module configured to send a notification of the presence of the one or more mails and the one or more images to a user device associated with a user; and
    a biometric sensor module, disposed on the main body, configured to authenticate an identity of the user accessing the mailbox to retrieve the one or more mails from the enclosed space of the mailbox.

2. The mailbox as claimed in claim 1, further comprising a battery configured to provide power to at least one of the sensor module, the camera module, the transmission module and the biometric sensor module.

3. The mailbox as claimed in claim 2, further comprising at least one solar panel disposed on the mailbox for charging the battery.

4. The mailbox as claimed in claim 1, wherein the biometric sensor module is a fingerprint sensor configured to acquire a fingerprint of the user for authenticating the identity of the user.

5. The mailbox as claimed in claim 4, wherein the biometric sensor module is configured to store one or more fingerprints of the user for matching the acquired fingerprint.

6. The mailbox as claimed in claim 4, wherein the main body comprises an openable door, and wherein the biometric sensor module is configured to open the openable door on authentication of the fingerprint of the user.

7. The mailbox as claimed in claim 1, wherein the sensor module is a motion sensor configured to detect insertion of the one or more mails in the mailbox.

8. The mailbox as claimed in claim 7, wherein the transmission module is configured to send the notification of the presence of the one or more mails and the one or more images to the user device using a home Wi-Fi network.

9. The mailbox as claimed in claim 8, wherein the transmission module is configured to send the notification of the presence of the one or more mails and the one or more images to a server, wherein the server is configured to send the notification and the one or more images to the user device.

10. A user device communicably coupled to a mailbox, the user device comprising:
   a communication interface configured to receive communication from the mailbox, the mailbox comprising a sensor module configured to detect presence of one or more mails in an enclosed space in the mailbox and a camera module configured to capture one or more images of at least a part of the one or more mails; and
   a processor configured to run a mailbox application accessible on the user device to cause the user device, at least in part to:
   facilitate receiving a notification of presence of the one or more mails in the mailbox by the communication interface, the notification being at least one of a text indicating presence of the one or more mails in the enclosed space in the mailbox and the one or more images; and
   display the notification on a user interface of the user device.

11. The user device as claimed in claim 10, wherein the processor is further configured to cause the user device to display the one or more images corresponding to the one or more mails in the mailbox on the user interface when a user accesses the mailbox application.

12. The user device as claimed in claim 10, wherein the processor is further configured to cause the user device to facilitate scanning of the one or more mails using the mailbox application in the user device.

13. The user device as claimed in claim 12, wherein the processor is further configured to cause the user device to facilitate storing of one or more scanned copies of the one or more mails in a storage location associated with the user device.

14. The user device as claimed in claim 13, wherein the storage location is in the cloud.

15. The user device as claimed in claim 13, wherein the processor is further configured to cause the user device to facilitate storing by facilitating creation of a folder for storing the one or more scanned copies.

16. The user device as claimed in claim 13, wherein the processor is further configured to cause the user device to perform retrieval of the one or more scanned copies from the storage location.

17. The user device as claimed in claim 13, wherein the processor is further configured to electronically share the one or more scanned copies with a plurality of users.

18. The user device as claimed in claim 13, wherein the processor is further configured to facilitate printing of the one or more scanned copies.

19. A mailbox, comprising:
   a main body, comprising an enclosed space for storing mails therein, the main body comprising an opening for inserting mails into the enclosed space;
   a camera module comprising
   a sensor module configured to detect insertions of one or more mails in the enclosed space, and
   a transmission module configured to send a notification of presence of the one or more mails and one or more images of at least a part of the one or more mails to a user device associated with a user, wherein the one or more images are captured by the camera module in response to detection of insertions of the one of more mails by the sensor module; and
   a biometric sensor module, disposed on the main body, configured to authenticate identity of the user accessing the mailbox to retrieve the one or more mails from the enclosed space of the mailbox.

20. A method for electronically organizing mails, the method comprising:
   receiving a notification of presence of one or more mails in a mailbox, the notification being at least one of a text indicating presence of the one or more mails and one or more images of the one or more mails;
   retrieving the one or more mails from the mailbox, wherein retrieving the one or more mails comprises authenticating identity of a user accessing the mailbox by a biometric sensor module of the mailbox;
   scanning the one or more mails retrieved from mailbox using a mailbox application in a user device; and
   storing the one or more scanned mails in a storage location associated with the user device.

* * * * *